Dec. 9, 1958     W. H. DRAUGHON     2,863,162
SNOW SWEEPING ATTACHMENT FOR LAWN MOWER
Filed May 16, 1956
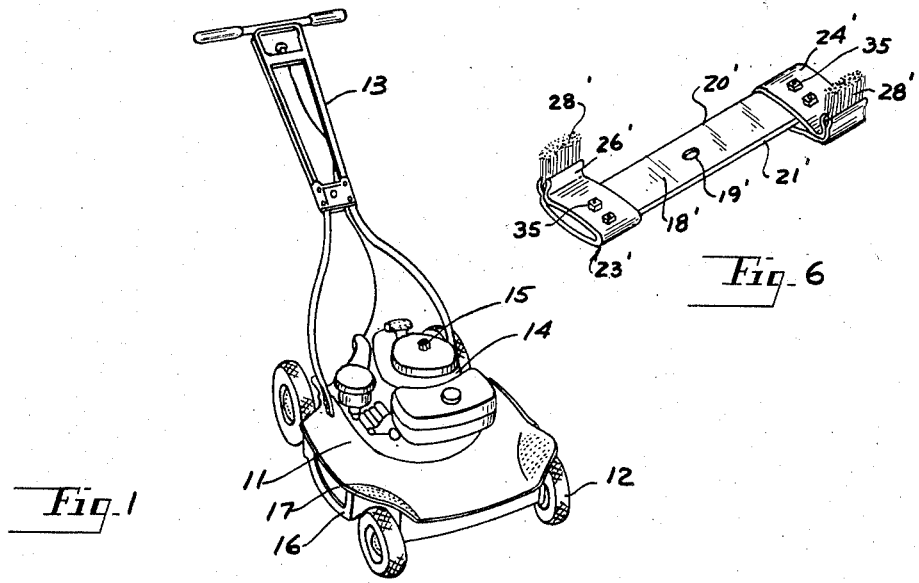
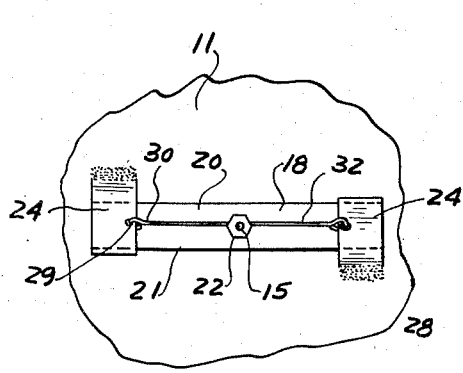
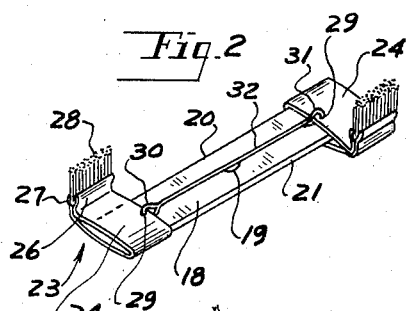
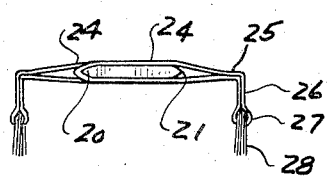
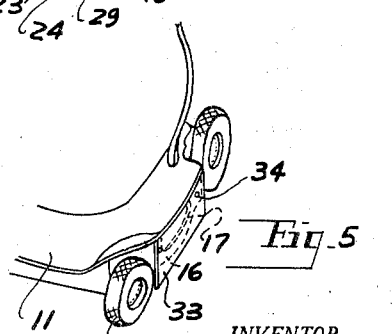
INVENTOR.
WILLIAM H. DRAUGHON
BY
Robert A. Sloman
ATTORNEY

2,863,162
SNOW SWEEPING ATTACHMENT FOR LAWN MOWER

William H. Draughon, Detroit, Mich.

Application May 16, 1956, Serial No. 585,229

4 Claims. (Cl. 15—79)

This invention relates to a snow sweeping attachment for a rotary type lawn mower.

In the present invention the conventional lawn mower including a horizontally rotatable blade may be changed over to a snow sweeper by the application over the ends of the lawn mower blade of a pair of brushes.

It is the object of the present invention to provide means for converting such lawn mower to a snow sweeping machine.

It is the further object of the present construction to provide means whereby this snow sweeping attachment may be just as easily removed for reconverting back to a lawn mower.

It is the further object of the present invention to provide a conversion to a snow sweeper which will cost less than 10% of the original cost of the lawn mower; while the cost of reconversion back to the lawn mower will be zero.

It is therefore a further object of the present invention to provide means whereby the very same machine used for cutting grass in the summer time may be used for sweeping snow in the winter.

These and other objects will be seen from the following specification and claims, in conjunction with the appendent drawings, in which:

Fig. 1 is a perspective view of a rotary type lawn mower incorporating the present snow sweeping attachment.

Fig. 2 is a bottom perspective view of the machine blade with the brushes mounted thereon.

Fig. 3 is a bottom plan view of the same.

Fig. 4 is an enlarged end elevation view of the blade with brushes thereon.

Fig. 5 is a fragmentary perspective view of the machine of Fig. 1 viewing its opposite side.

Fig. 6 is a perspective view of an interchangeable brush support.

It is understood that the above drawing illustrates merely a preferred embodiment of the invention, and that other embodiments are contemplated within the scope of the claims hereafter set forth.

Referring to the drawing the lawn mower shown in Fig. 1 has a hollow casing 11 mounted upon the wheels 12, and includes the conventional handle 13.

A suitable motor 14 is mounted on said casing and includes the upright driven shaft 15, which is capable of revolving approximately 3000 to 4000 revolutions per minute.

Shaft 15 projects down into casing 11 and at its lower end has mounted thereon the horizontally disposed elongated rotary blade 18 which includes the opposite cutting edges 20 and 21. Said blade has a central aperture 19 which receives shaft 15, said blade being secured thereon by nut 22.

A brush assembly 23 is removably secured over the opposite outer ends of blade 18. Said assembly in each case includes a narrow elongated horizontally disposed sleeve 24, which is snugly projected over the end of blade 18, transversely of its longitudinal axis. The sleeves 24 extend to opposite sides of the blade as indicated in Figure 4. Outer portions 25 of each sleeve converge toward each other and terminate in the downturned members 26. The lower opposed portions of members 26 are arcuately formed at 27 defining an elongated clamp. The elongated bristle brush 28, which may be metallic or non-metallic, is fixedly secured within each of the clamps 27.

Each of the sleeves 24 has a transverse aperture 29 at its one edge adapted to receive the eyes 30 and 31 at the respective ends of tie rod 32. The purpose of this rod is to prevent outward movement of the two sleeves under centrifugal force from the rotation of blade 18.

Rod 32 extends beneath nut 22 and is tightly secured and retained thereby to prevent relative movement of the sleeves inwardly or outwardly of the ends of blade 18.

As viewed in Figures 1 and 5 the casing 11 includes on its opposite sides a pair of formed upright walls 16, which extend towards and are adjacent the ground surface. Said plates each have a transverse elongated aperture 17 through which grass cuttings are projected by the rotary action of blade 18.

In the present invention it is desirous that one of the apertures 17 be closed off, so that the snow driven by the brushes 28 will be projected from only the right side of the machine. For this purpose there is provided an upright plate 33 mounted over one of the side walls 16 and secured thereto by the fasteners 34, Figure 5.

Primarily the use of the brushes on the revolving blade will sweep the snow beyond the path of the brushes. Secondly, as a result of the strong force of wind from the rapidly revolving fan-like brushes, the snow will be blown still further away and out through the side aperture 17, Figure 1. These brushes project downwardly from blade 18 and are adapted for light engagement with the ground surface.

Figure 6 shows a slightly different form of the present invention wherein the standard horizontally rotatable blade 18 is merely removed from its drive shaft and blade 18' substituted therefor.

Figure 6 is the same as Figure 2 utilizing similar numerals which are primed and wherein rod 32 and its eyes 30 and 31 of Figure 2 are omitted. Bolts 35 are employed at opposite ends of blade 18' for securing sleeves 24' and their brushes 28' to outer end portions of blade 18'.

Accordingly the conversion from lawn mower to snow sweeper is accomplished merely by removing blade 18 and substituting brush support 18' of Figure 6.

Having described my invention reference should now be had to the claims which follow:

I claim:

1. In combination a hollow lawnmower casing, an upright power driven shaft journaled and supported therein, a horizontally elongated support secured to said shaft and rotatable on a vertical axis, a snow sweeper comprising a pair of narrow elongated horizontally disposed sleeves removably projected over and secured to opposite outer ends of said support transversely of its longitudinal axis and extending to opposite sides thereof, outer portions of each sleeve being turned downwardly with their lower opposed ends defining a clamp, an elongated brush within each clamp depending downwardly and adapted to engage the ground surface, said brushes being parallel to and on opposite sides of said support axis, a tie rod interconnecting said sleeves and centrally anchored to the support for preventing relative movement of said sleeves inwardly and outwardly of the support ends.

2. The construction of claim 1, said casing including apertured upright side walls, and an upright snow retainer plate mounted on one of said walls closing off its aperture.

3. The construction of claim 1, a nut on said power driven shaft engaging said support, said tie rod passing between said nut and support and tightly secured thereby.

4. In combination, a hollow lawnmower casing, an upright power driven rotary shaft therein, a snow sweeper comprising a flattened elongated support mounted on said shaft, a pair of narrow elongated horizontally disposed sleeves projected over and secured to opposite outer ends of said support, transversely of its longitudinal axis and extending to opposite sides thereof, outer portions of each sleeve being turned downwardly with their lower opposite ends defining a clamp, an elongated brush within each clamp depending downwardly and adapted to engage the ground surface, said brushes being parallel to and on opposite sides of said support axis, and means securing said sleeves to said support.

References Cited in the file of this patent

UNITED STATES PATENTS

| | | |
|---|---|---|
| 376,800 | Frisbie | Jan. 24, 1888 |
| 548,201 | Hvass | Oct. 22, 1895 |
| 590,288 | Winspear et al. | Sept. 21, 1897 |
| 1,439,832 | Merrill | Dec. 26, 1922 |
| 2,154,564 | Eisenlohr | Apr. 18, 1939 |
| 2,476,526 | Badlat | July 19, 1949 |
| 2,566,724 | Heil | Sept. 4, 1951 |
| 2,726,503 | Phelps | Dec. 13, 1955 |